C. O. MICHAELSEN.

ROCK CRUSHER.

APPLICATION FILED OCT. 28, 1920.

Reissued Aug. 16, 1921.

15,179.

4 SHEETS—SHEET 1.

INVENTOR

Charles O. Michaelsen

BY C. P. Goepel

ATTORNEY

C. O. MICHAELSEN.

ROCK CRUSHER.

APPLICATION FILED OCT. 28, 1920.

Reissued Aug. 16, 1921. 15,179.

4 SHEETS—SHEET 2.

INVENTOR
Charles O. Michaelsen
BY C. P. Goepel
ATTORNEY

C. O. MICHAELSEN.

ROCK CRUSHER.

APPLICATION FILED OCT. 28, 1920.

Reissued Aug. 16, 1921. 15,179.

4 SHEETS—SHEET 3.

INVENTOR
Charles O. Michaelsen
BY C. P. Goepel
ATTORNEY

C. O. MICHAELSEN.

ROCK CRUSHER.

APPLICATION FILED OCT. 28, 1920.

Reissued Aug. 16, 1921.

15,179.

4 SHEETS—SHEET 4.

INVENTOR
Charles O. Michaelsen.
BY C. P. Goepel
ATTORNEY

UNITED STATES PATENT OFFICE.

CHARLES O. MICHAELSEN, OF MINNEAPOLIS, MINNESOTA, ASSIGNOR TO MICHAELSEN MACHINERY COMPANY, A CORPORATION OF NEVADA.

ROCK-CRUSHER.

15,179. Specification of Reissued Letters Patent. Reissued Aug. 16, 1921.

Original No. 1,063,889, dated June 3, 1913, Serial No. 745,726, filed February 1, 1913. Application for reissue filed October 28, 1920. Serial No. 420,282.

*To all whom it may concern:*

Be it known that I, CHARLES O. MICHAELSEN, a citizen of the United States, and a resident of Minneapolis, in the county of Hennepin and State of Minnesota, have invented certain new and useful Improvements in Rock-Crushers, of which the following is a specification.

My invention relates to machines for breaking or crushing ore and the like, and it is the object thereof to provide in a machine of this kind means for actuating a pair of crushing-jaws so as to produce an oscillating movement of the jaws in which certain portions thereof will remain at a substantially constant distance from each other while other portions of the jaws will move toward and away from each other, the jaws also having a certain sliding or rubbing movement relative to each other.

Further objects of my invention are to provide means for varying the amount of movement imparted to the jaws, for changing the angular relation of the working faces thereof, for compensating wear of the working faces, for compensating and taking up wear of the working surfaces of the actuating mechanism and for replacing at a minimum expense the wearing parts of the actuating mechanism.

Figure 1:
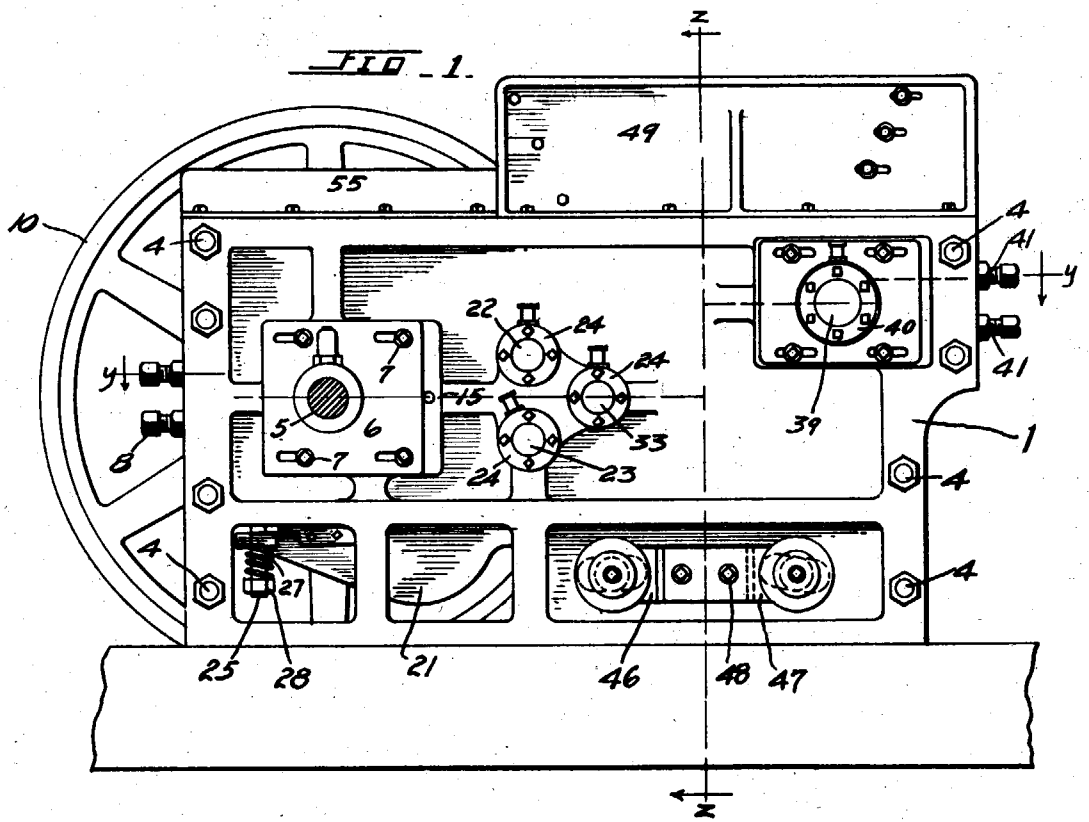
Figure 2:
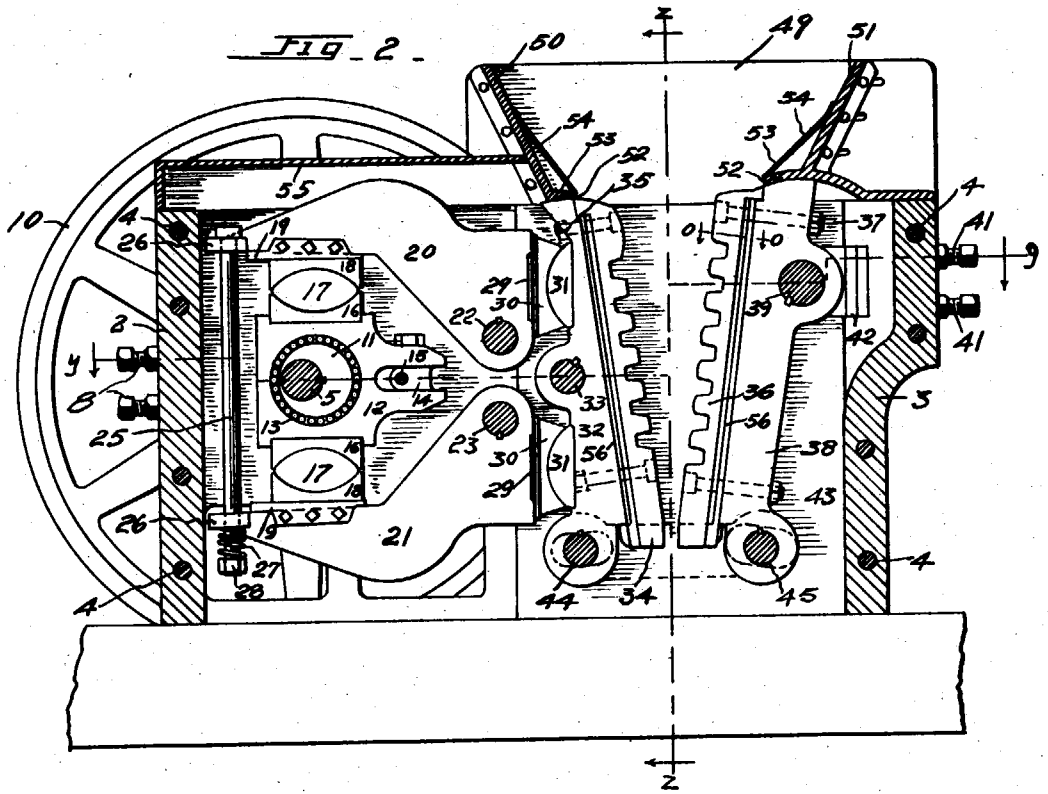
Figure 3:
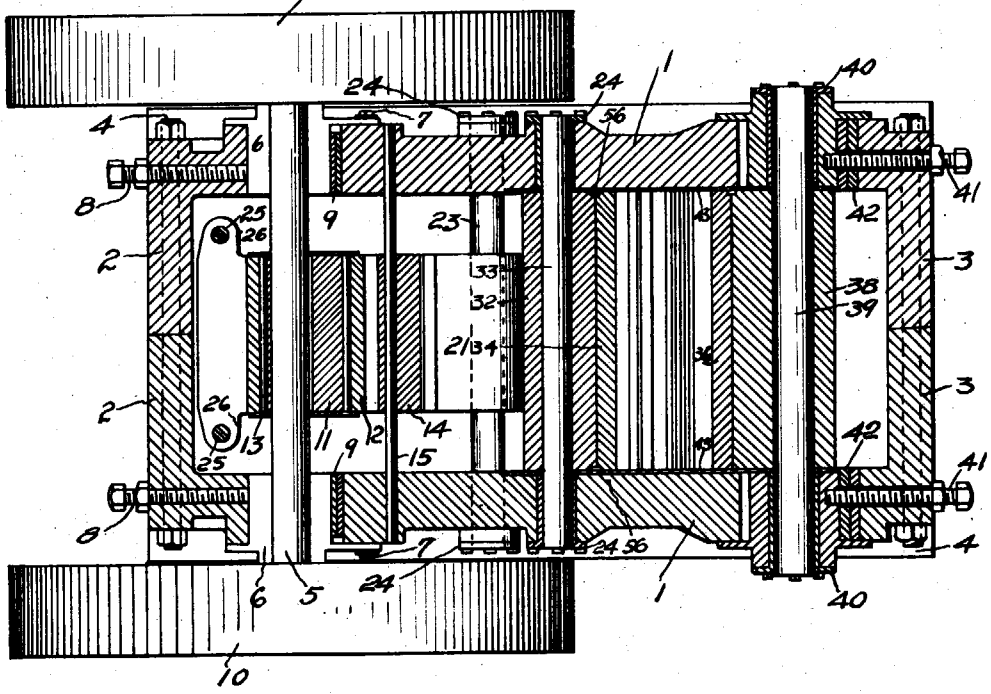
Figure 4:
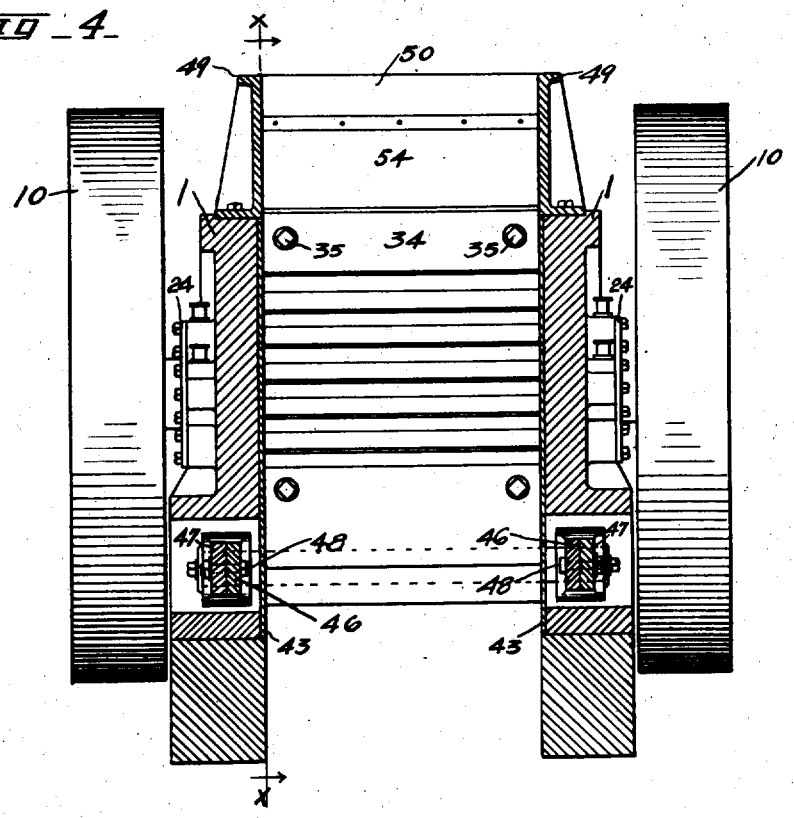
Figure 5:
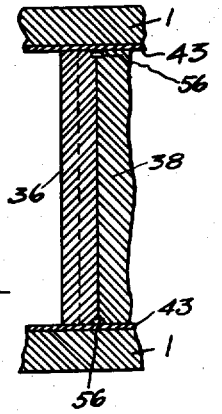
Figure 6:
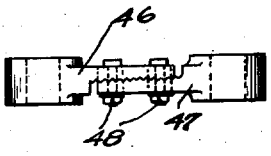

In the accompanying drawings Figure 1 is a side view of a machine embodying my invention, the adjacent fly-wheel of the machine being removed, Fig. 2 is a longitudinal vertical sectional view of the machine, the section being on the plane of the line *x—x* of Fig. 4, Fig. 3 is a horizontal sectional view on the plane of the line *y—y* of Fig. 1, Fig. 4 is a transverse vertical section on the plane of the line *z—z* of Fig. 2, Fig. 5 is a detail section of the swinging beam and jaw-plate on the plane of the line *o—o* of Fig. 2, and Fig. 6 is a detail plan view of one of the connecting links for the rocking-beam and swinging-beam.

In the construction shown I employ a frame consisting of the side-pieces 1, each of which has at the ends thereof the laterally extending flanges 2 and 3. The ends of said flanges are machined smooth and placed together, and the two sides of the frame are secured together by transverse bolts 4 passing through the flanges, as shown.

The main or driving shaft 5 extends transversely through the frame near the rearward end thereof, being journaled in boxes 6 disposed in suitable guideways in the frame. Said boxes have slotted flanges extending over the sides of the frame, bolts 7 being passed through the flanges, as shown. Adjusting-screws 8 are passed through the end of the frame, and lining-plates 9 are disposed in the guideways so as to approximately fill the longitudinal space therein not occupied by the boxes. By changing the lining-plates 9 and manipulating the screws 8, the positions of the boxes and the shaft may be varied longitudinally of the frame for the purpose hereinafter set forth. On the ends of the shaft 5 are carried fly-wheels 10, one or both of which may be used as a pulley or pulleys and connected by belt with a suitable source of power. On the central portion of the shaft is an eccentric 11, and around the eccentric is disposed the eccentric-slide 12, a roller bearing 13 being placed between the eccentric and the slide, as shown. The forward end of the eccentric-slide is forked and passes slidably over a block 14 which is pivotally mounted on a transverse rod 15. The upper and lower sides of the eccentric-slide have transverse rectangular channels made therein and in said channels are disposed the facing-blocks 16 of which the sides remote from the slide have transverse cylindro-segmental concavities therein. In said concavities are disposed the rocking-blocks 17 of which both the upper and lower faces are convex and of cylindro-segmental form. On the outer faces of the blocks 17 are fitted the rocking slides 18 of which the outer surfaces are flat and fit slidably against the facing-plates 19 secured on the adjacent faces of the horizontal portion of the levers 20 and 21. Said levers are connected to the shafts 22 and 23, respectively. The end portions of said shafts are journaled in bushings 24 which pass through the sides of the frame, the bushings having flanges at their outer ends which are secured by screws to the frame, as shown. The portions of the facing-plates 19 between the levers and rocking-slides are wedge-shaped, the plates have slotted flanges overhanging the sides of the levers, and suitable screws are passed through the slots in the flanges to secure the plates to the levers.

By adjusting the plates longitudinally wear of the parts may be compensated. The rearward ends of the levers 20 and 21 are connected to each other by bolts 25 which pass slidably through lugs 26 at the sides of the levers, springs 27 being disposed around the lower ends of the bolts so as to yieldably press the levers toward each other. The compression of the springs may be varied by means of the nuts 28.

On the front sides of the levers 20 and 21 are flat surfaces on which are secured the flat facing-plates 29. Said plates are slidably engaged by the flat sides of the rocking-slides 30, the opposite sides of the slides being concave, and fitting upon the convex surfaces of the blocks 31 which are set in transverse rectangular channels in the rearward side of rocking-beam 32.

The beam 32 is mounted on a transverse shaft 33 which passes through the central part of the beam and is journaled in bushings 24 in the frame, similarly to the shafts 22 and 23. On the front face of the rocking-beam the transversely serrated jaw-plate 34 is secured by means of bolts 35 passing through the plate and the beam. A similar jaw-plate 36 is secured by bolts 37 to the swinging-beam 38 which is hung on a transverse shaft 39. A swinging beam 38 is pivoted near its upper end and on an axis parallel to the axis of the rocking beam. Said shaft is journaled in bearing-boxes 40 which are held in suitable guideways in the frame, the boxes having slotted flanges which fit against the outer sides of the frame and are secured thereto by screws passing through the slots. The boxes 40 may be adjusted longitudinally of the guideways by means of screws 41 which pass through the ends of the frame, as shown in Fig. 3, lining-plates 42 being employed to fill in the spaces between the boxes and the ends of the guideways.

The inner sides of the frame adjacent to the rocking-beam and swinging-beam are covered by plates 43 which are preferably of hard steel and smooth-surfaced. Through the lower ends of the beams are passed shafts 44 and 45 which extend through arcuate slots in the plates 43, the slots being concentric to the respective shafts 33 and 39. The ends of the shafts 44 and 45 are connected to each other by links each consisting of two parts 46 and 47 having overlapping serrated faces, and bolts 48 passing through slots therein to hold the serrated faces together. The length of the links may be varied by securing the overlapping parts in different relations to each other.

Upon the upper part of the frame above the rocking-beam and swinging-beam is disposed a hopper consisting of the side-plates 49 and transverse plates 50 and 51. The plate 50 is fixedly connected with the side-plates, and the plate 51 is connected thereto by bolts which pass through longitudinal slots therein, so that the position of the plate may be varied longitudinally. The lower portions of the plates 50 and 51 fit against the arcuate upper ends of the rocking and swinging-beams and are provided with packing-strips 52, arranged as shown in Fig. 2 and secured to the plates by bolts 53, the upper ends of the bolts being covered over by plates 54.

Behind the hopper a cover-plate 55 is placed across the top of the frame so as to inclose the actuating mechanism and protect it from dust and the like. As a further means of preventing dust and abrasive material from reaching the bearings and working surfaces of the actuating mechanism I provide channels 56 in the sides of the rocking-beam, swinging-beam and jaw-plates, adjacent to the plates 43 on the inner sides of the frame. The upper ends of the channels are closed so as to prevent material from the hopper passing down into them, and the lower ends are open so that any material that may work back from the crushing-throat, between the sides of the jaws and the plates 43, may, upon reaching the channels, pass down through them and be discharged at the lower ends thereof.

In the operation of the machine the materials to be crushed are fed into the hopper and pass therefrom by gravity into the throat or crushing-space between the jaw-plates carried on the adjacent faces of the rocking-beam and swinging-beam. Rotation of the main shaft 5 causes a vertical oscillating and longitudinal reciprocating of the eccentric-slide, and also a slight tilting movement thereof resulting from its engagement with the pivoted block 14. The vertical movements of the eccentric-slide are communicated to the levers 20 and 21, the tilting and longitudinal reciprocating movements of the slide being permitted by the oscillation or rocking of the parts 17 and 18, and the sliding movement of the latter upon the facing-plates 19. The oscillating movements of the levers 20 and 21 are communicated to the rocking-beam through the rocking-slides 30 and convex bearing-blocks 31. The movements of the lower end of the rocking-beam 32 are communicated by the connecting links between the shafts 44 and 45 to the lower end of the swinging-beam 38.

The width of the throat between the upper ends of the jaw-plates may be varied by adjusting the position of the shaft 39 longitudinally of the frame, a similar adjustment being made of the hopper end-plate 51. The width of the throat between the lower ends of the jaw-plates may be varied by varying the length of the connecting links between the shafts 44 and 45. The same adjustments will serve to compensate wear of the faces of the jaw-plates. The movements imparted to the levers 32 and 38 by the actuating mechanism are such that the width of the lower end of the throat between the jaw-plates is practically constant, while the width of the throat at the upper part thereof varies considerably, the upper parts of the jaws moving alternately toward and away from each other. There is also a certain vertical movement of the jaws relative to each other, the lower end of the jaw 36 moving slightly upward while the adjacent end of the jaw 34 is moving downwardly, and the latter then moving upward while the other is moving downwardly. This movement results in a rubbing or scouring of the materials between the jaws in the lower part of the throat.

By varying the position of the main shaft longitudinally of the frame the amount of movement imparted to the levers 20 and 21 may be varied, the throw of the levers being increased as the main shaft is moved toward the fulcrum-shafts 22 and 23, and decreased as the distance from the fulcrum-shafts to the main-shaft is increased.

I claim:

1. In a machine of the character described, a rocking beam, a swinging beam, jaw plates on the adjacent faces of the beams, means for directing the material into the space between the jaw plates, and means comprising a shaft for the rocking beam pivotally supporting the same near its central part, a shaft for the swinging beam pivotally supporting the same near its upper end, a link, a shaft fixed to the lower end of each beam and pivotally connecting each beam with one end of the link and positioning the link axially of said shafts in spaced relation to the beam ends, said last named means to provide, upon the movement of one of the beams, an oscillatory movement of both beams with a simultaneous vertical movement of the opposing faces of the beams relatively to each other, the simultaneous oscillation of the beams causing said opposing faces at the upper ends of the beams to move alternately toward and away from each other while the lower end portions of said opposing faces remain at a substantially constant distance from each other.

2. In a machine of the class described, a horizontal driving-shaft, an eccentric carried thereon, a tilting body disposed around the eccentric, two levers having horizontal portions extending respectively above and below the tilting body, the levers being fulcrumed on axes near a horizontal plane passing through the axis of the driving-shaft, sliding and rocking bearing-members disposed between the adjacent faces of the levers and the tilting body, a rocking beam pivoted at its central part on an axis disposed near the lever fulcrums, the levers having plane-surfaced parts adjacent to the rocking-beam above and below the axis thereof, said lever parts being approximately parallel to the said portions of the rocking-beam, and rocking and sliding bearing-members disposed between said lever parts and said portions of the rocking beam.

3. In a machine of the class described, a driving shaft, an eccentric carried by the shaft, a tilting body disposed around the eccentric, two levers having horizontal portions extending respectively above and below the tilting body, the levers being fulcrumed on axes near a horizontal plane passing through the axis of the driving-shaft, sliding and rocking bearing-members disposed between the adjacent faces of the levers and the tilting body, a rocking-beam pivoted at its central part on an axis disposed near the lever fulcrums, rocking and sliding bearing-members, disposed between the levers and the adjacent parts of the rocking-beam above and below the axis thereof, and means for varying the position of the driving shaft toward and away from the lever fulcrums to change the throw of the levers caused by the eccentric and tilting body.

4. In a machine of the class described a frame, beams mounted to oscillate between the sides of the frame, jaw-members on the adjacent faces of the beams, lining-plates secured on the inner sides of the frame and slidably engaged by the lateral edges of the jaw-members, said plates inclosing the sides of a vertical throat between the jaw-members, and means forming channels in the edges of the jaw-members adjacent to the lining-plates and extending parallel to the adjacent faces of the jaw-members.

In testimony whereof I have hereunto subscribed my name in the presence of two witnesses.

CHARLES O. MICHAELSEN.

Witnesses:

CHARLES P. BROWN,
CHRISTINE LUDWIG.